United States Patent Office 3,057,206
Patented Oct. 9, 1962

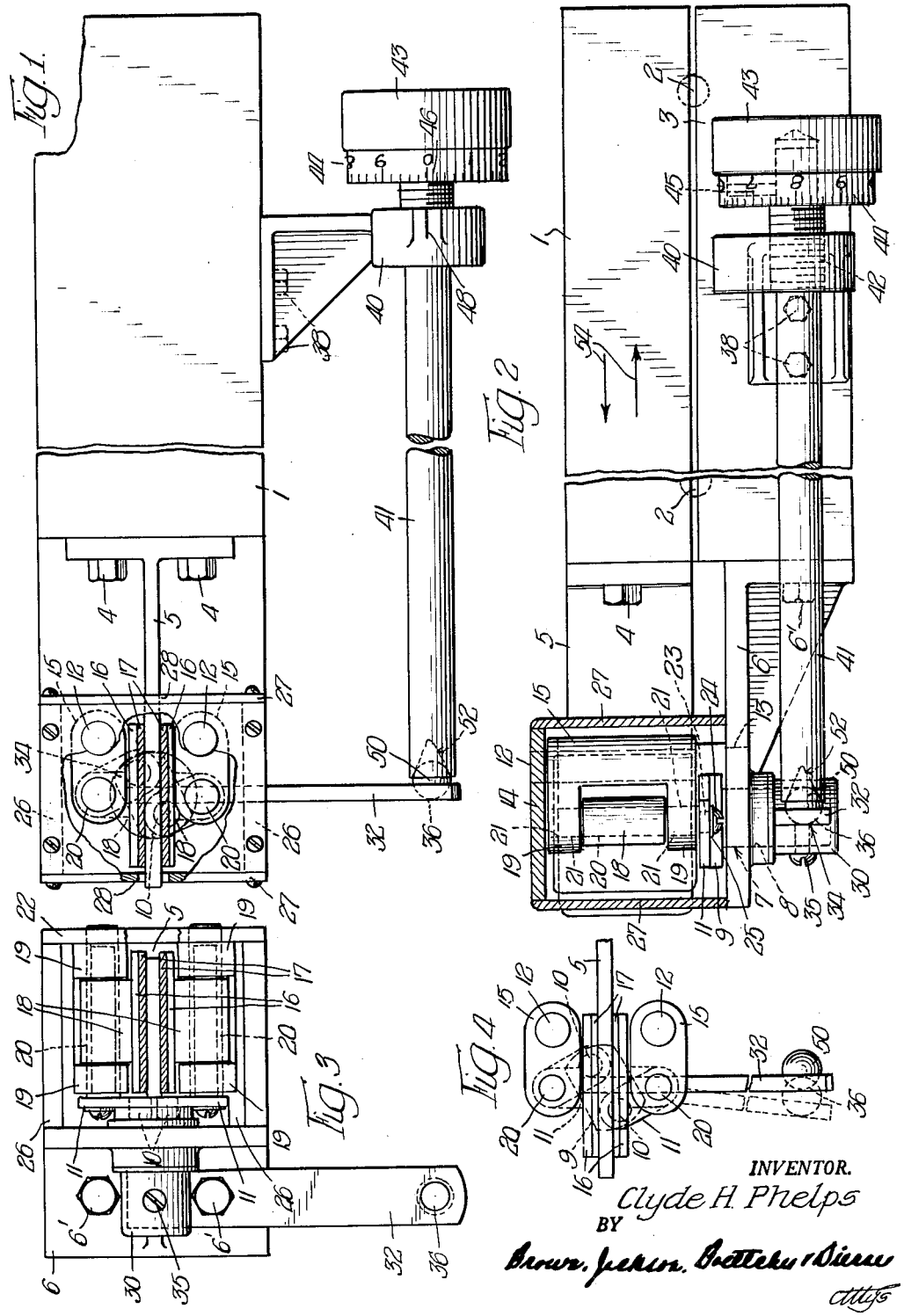

3,057,206
UNBALANCE FORCE INDICATOR
Clyde H. Phelps, Springfield, Ill., assignor to Raydyne Corporation, Springfield, Ill., a corporation of Illinois
Filed Sept. 24, 1959, Ser. No. 842,068
11 Claims. (Cl. 73—478)

This invention relates to an unbalance force indicator, and more particularly to an unbalance force indicator for attachment to dynamic balance testing machines to increase the safety of operation thereof, and to provide a means for indicating the force developed by unbalance.

Because most rotating bodies or apparatus cannot be designed and built to be in good running balance, such bodies or apparatus must be dynamically balanced after manufacture. This procedure is standard practice throughout industry.

In a large majority of cases, the parts are very much out of balance, and unsafe to operate at the designed speed. Such parts are often mounted on knife-edges and a portion of the excess unbalance corrected by adding or removing weight to reduce the amount of unbalance to a point where it is safe to rotate the part at some reasonable speed in a balancing machine in order to effect complete balance.

In most cases, when weight correction is made to correct for large amounts of unbalance before running the piece in a balance testing machine, large values of unbalance are created that did not exist in the piece before such correction.

The aforementioned unbalance is created because, when the piece is mounted on knife-edges, the piece can be corrected anywhere along its length without regard to the plane of actual unbalance. For example, a long rotor with heavy unbalance near one end can be corrected on knife-edge equipment by adding an equal value of corrective weight on the opposite end from the actual unbalance. This sets up excessive dynamic unbalance, such that the rotor now has greater unbalance than before correction.

It is near impossible to static balance a rotor and obtain running balance. Therefore, in either case, the rotor, before or after static balance, may present danger in operation when running because of the excessive motion created by static or dynamic unbalance.

Because it is necessary to rotate the piece effectively to correct for both static and dynamic unbalance, it is also necessary to indicate the value and position of the unbalance before correction can be made.

The broad concept of the present invention resides in the provision of a device adapted for application to a balance testing machine to stop the excessive motion and hold the motion or vibration to zero, and at the same time adapt it to measure the force developed by the unbalance, such that the proper weight correction can be made. This eliminates the need for knife-edge static balancing, and it eliminates the danger of excessive vibration.

In the manufacture, for example, of long tube rolls used in paper making machines, very heavy unbalance is found because of the non-uniform wall section of the tube or pipe used. Many paper machine roll builders run these rolls at low speed to indicate unbalance, and then attach temporary steel bars to reduce the unbalance enough so that the rolls may run at their higher operating speed and further correction made.

Where temporary correction bars are employed, they are held to the outside of the roll by banding, or are wound and tied with cord. After satisfactory balance is obtained, the correct value is computed, and weight corresponding therewith is fastened to the inside of the tube.

The foregoing is a dangerous operation, because the test bars, under the action of increasing centrifugal force, break the banding or cord and fly off into space, leaving the rotor in a heavily unbalanced state and pounding the bearings and supports to destruction.

The present invention eliminates the need for temporary correction bars or weights, prevents excessive motion, and measures the force developed by the unbalance, so that the permanent correction bars or weights can be attached to the inside of the roll, such that the roll may now be operated at its higher running speed, with complete freedom from the risk of correction weights flying off.

The device of the present invention is of simple and inexpensive construction, does not contain rotating parts or force creating motion, but does provide a calibrated friction brake which can be adjusted to hold the motion to zero. The friction thus applied to hold the motion to zero being a measure of the force developed by the unbalance at this operating speed, if now, correction bars or weights are attached to develop an equal force, complete balance is obtained at all speeds. This is because the force developed by unbalance varies as the square of the speed. Accordingly, the force developed by the correction weights varies exactly the same.

The preferred embodiment of the friction brake, unbalance force indicator, is calculated in pounds. Therefore, with the correction radius known, it is a simple matter to select a correction weight that will develop the required correction force.

Any reliable indicator of the angular position of unbalance may be used in connection with the present unbalance force indicator. The balance testing means of my United States Letters Patent No. 2,740,297 of April 3, 1956, is a satisfactory means for indicating the angular position of unbalance.

Further features and numerous advantages and adaptations of the invention will be apparent from the following detailed description taken in connection with the accompanying drawing, it being understood that the invention is limited only within the scope of the appended claims and not to the particular embodiment selected for illustration.

In the drawings:

FIGURE 1 is a fragmentary top plan view of the unbalance force indicator of the present invention, partially broken away, as applied to the movable and static heads of a balance testing machine;

FIGURE 2 is a fragmentary front elevational view of the parts shown in FIGURE 1, partially in section;

FIGURE 3 is an end view of the parts shown in FIGURES 1 and 2; and

FIGURE 4 is a fragmentary view showing the actuator spring and linkage between the control screw and the friction plates.

Referring now to the drawing, the upper movable head of a balance testing machine is shown at 1. The head 1 moves, or oscillates, endwise, as illustrated in FIGURES 1 and 2 on balls 2 supported by the lower stationary or static head 3 of the balance testing machine.

The roll, or other part with which the force developed by unbalance is to be indicated by the device of the present invention, is supported on the upper movable head 1, for example, by a suitable bearing support, as well known in the art. For purposes of simplifying the disclosure, the bearing support and roll or other part have not been shown in the drawing. Suffice it to state that unbalance in the roll or other part creates motion of the head 1 corresponding to the unbalance.

Attached to the end of the upper movable head 1 by cap screws 4 is a brake plate 5. The screws 4 coact with base flanges on the brake plate 5. The brake plate 5 thus moves or oscillates endwise with the movable head 1.

Attached by cap screws 6' to the end of the lower static head 3 beneath the brake plate 5 is a base bracket 6. Mounted at 7 to turn about its axis in the bracket 6 is a drive pin 8. The upper end of this pin 8 has an enlarged head 9 to which are pivoted by pull link pins 10, 10 a pair of pull links 11, 11. The pivots provided by the pins 10, 10 are disposed eccentrically with respect to the axis of turning movement of the drive pin 8.

A pair of vertical pivot pins 12, 12, one on each side of the brake plate 5 are mounted at their lower ends at 13, 13 in the base bracket 6 and at their upper ends in a top plate 14. A pair of generally U-shaped pressure links 15, 15 are mounted to turn on the pivot pins 12, although they may be fixed on these pins 12 and the pins mounted to turn in the bracket 6 and top plate 14.

A pair of pressure plates 16, 16, one on each of the opposite sides of the brake plate 5 carry friction plates 17 for frictional coaction with the opposite sides of the brake plate 5, as will be hereinafter described. The pressure plates 16 have integral lugs or protruding parts 18 which fit between the arms 19, 19 of the pressure links 15, 15 (FIGURE 2) and are mounted to turn on pivot pins 20, 20 mounted at their opposite ends in the arms 19, 19 at 21. The pull links 11, 11 at their ends opposite the ends pivoted at 10 to the drive pin 8 are pivoted by pivot pins 22 to the reduced lower ends 23 of the pivot pins 20. Retaining screws 24 and washers 25 are provided for the links 11.

The aforementioned parts are housed between side plates 26, 26, top plate 14 and cover plates 27, 27, the housing structure being mounted on the bracket 6. The brake plate 5 extends through openings 28, 28 in the cover plates 27. The downwardly extending lower end of the drive pin 8 is enclosed within a cap 30.

An actuator leaf spring 32 of generally rectangular cross-section is disposed with one end entering through an opening in the cap 30 and into a correspondingly shaped diametrical opening 34 in the drive pin 8. This end of the spring 32 is secured in place in the opening in the pin 8 by a screw 35. The spring 32 extends outwardly from the pin 8 and cap 30 and has an opening or recess 36 near its outer end for a purpose which will presently appear.

Attached by cap screws 38 to the lower static head 3 of the balance testing machine is a nut block 40. A control screw 41 disposed generally parallel with the head 3 and extending through the nut block 40 has screwed or threaded engagement with this nut block at 42. A control knob 43 having an indicating dial 44 is fixed on one end of the screw 41, for example, by a set screw 45.

The indicating dial 44 bears a scale 46. This scale 46 is graduated, for example, in units marked from 1 to 9, with each of these units broken down into five smaller units. These units or markings indicate by cooperation with a fixed reference point, as shown, for example, by the line 48 on the nut block 40, the various pounds of force with which the friction plates 17 are applied to the brake plate 5.

The opposite end of the control screw 41 is disposed adjacent to the opening 36 in the actuator spring 32, but in spaced relation with respect to this spring. Coaction between the screw 41 and the spring 32 is through a ball 50 interposed between the spring 32 and the adjacent end of the screw 41. The ball 50 is retained by engagement in the opening 36 and in a conical and axially disposed recess 52 in the end of the screw 41.

In the use of the device and the practice of the method according to the present invention, the roll or other workpiece is placed in the bearing support on the upper movable head 1 and rotated. Unbalance in the roll or other workpiece causes movement or oscillation of the head 1 in the directions of the arrows 54 appearing in FIGURE 2. Accordingly, the brake plate 5 is similarly moved or oscillated between the friction plates 17.

Then by turning the control screw 41 by means of the knob 43 the endwise movement of the screw 41 acts through the ball 50 and actuator spring 32 to turn the drive pin 8. This turning of the pin 8 by movement, for example, of the spring 32 from its full line position to its dotted line position, as shown in FIGURE 4, acts through the linkage and pressure plates 16 described to close the friction plates 17 against the sides of the brake plate 5 with more or less pressure.

The control screw 41 is adjusted to press the friction plates 17 against the sides of the brake plate 5 with sufficient pressure to hold the motion caused by unbalance to zero. This will vary with the amount of unbalance. The pressure with which the friction plates 17 are applied to hold the motion caused by unbalance to zero is indicated on the scale 46.

The friction thus applied to hold the motion to zero is a measure of the force developed by the unbalance at this operating speed. As previously stated the friction brake, unbalance force indicator, is calibrated in pounds. Therefore, with the correction radius known, it is a simple matter to select a correction weight that will develop the required correction force. Correction bars can then be attached to the roll or other workpiece to develop an equal force, and, thus, complete balance is obtained for all speeds. As previously stated, this is because the force developed by unbalance varies as the square of the speed. Accordingly, the force developed by the correction weight varies exactly the same.

In actual balancing operation practice, the control screw 41 is turned to position for maximum pressure of the friction plates 17 against the sides of the brake plate 5.

The workpiece may then be put in low speed rotation and the control screw 41 adjusted until some motion of the brake plate 5 is evident. Then, additional pressure is applied by turning the screw 41 until all motion stops and the value of the unbalance force is indicated by the scale 46 on the indicating dial 44 in cooperation with the index mark 48.

The embodiment of the invention disclosed in the drawings and the specification is for illustrative purposes only, and it is to be expressly understood that said drawings and the specification are not to be construed as a definition of the limits or scope of the invention, reference being had to the appended claims for that purpose.

I claim:

1. In an unbalance force indicator, in combination, a brake plate attached to the movable head of a balance testing machine, a base bracket attached to the static head of the balance testing machine, a pair of friction plates carried by said base bracket, one on each of the opposite sides of said brake plate, a pair of pressure links connected to said friction plates and pivoted by pivot pins on said base bracket, a drive pin mounted for turning movement on said base bracket, a pair of links pivoted by pins to said drive pin eccentrically with respect to the axis of turning movement of said drive pin and to said pressure links, and calibrated adjustment means operable to turn said drive pin to apply said friction plates against the opposite sides of said brake plate with more or less pressure and in amount to hold the motion of said brake plate to zero, said calibrated adjustment means being calibrated in terms which are a measure of the unbalance in a rotary body carried by and with which the movable head of the balance testing machine is movable.

2. In an unbalance force indicator, in combination, a brake plate attached to the movable head of a balance testing machine, a base bracket attached to the static head of the balance testing machine, a pair of friction plates carried by said base bracket, one on each of the opposite sides of the brake plate, a pair of pressure links connected to said friction plates and pivoted by pivot pins on said base bracket, a drive pin mounted for turning movement on said base bracket, a pair of links pivoted by pins to said drive pin eccentrically with respect to the axis of turning movement of said drive pin and to said pressure links, and a control screw screwed in a nut block attached to the static head of the balance testing machine and having a control knob provided with a calibrated indicating dial, said control screw being arranged to turn said drive pin and actuate said links by movement of the screw to apply more or less pressure to said friction plates.

3. In an unbalance force indicator, in combination, a brake plate attached to the movable head of a balance testing machine, a base bracket attached to the static head of the balance testing machine, a pair of friction plates carried by said base bracket, one on each of the opposite sides of said brake plate, a pair of pressure links connected to said friction plates and pivoted by pivot pins on said base bracket, a drive pin mounted for turning movement on said base bracket, a pair of links pivoted by pins to said drive pin eccentrically with respect to the axis of turning movement of said drive pin and to said pressure links, a control screw screwed in a nut block attached to the static head of the balance testing machine and having a control knob provided with a calibrated indicating dial, and an actuator spring coacting with said control screw and said drive pin for actuating said links by movement of said screw to apply more or less pressure to said friction plates.

4. An unbalance force indicator according to claim 3 wherein the coaction between the control screw and the actuator spring is through a ball interposed between said screw and said actuator spring.

5. In an unbalance force indicator, in combination, a static head, a movable head supported by said static head for motion by unbalance in a rotary body, a friction brake member attached to said movable head for movement therewith, friction brake means carried by said static head and frictionally coacting with said friction brake member, means carried by said static head for adjusting said friction brake means to adjust the frictional cooperation thereof with said friction brake member to hold the motion of said movable head caused by unbalance to zero, and indicating means acting to indicate the amount of frictional coaction of said friction brake means with said friction brake member.

6. An unbalance force indicator according to claim 5, wherein the means carried by the static head for adjusting the friction brake means carried by said static head comprises adjustable means calibrated in pounds, whereby with the test article rotational speed and the correction radius known to enable selection of a correction weight that will develop the required correction force.

7. An unbalance force indicator according to claim 5, wherein the friction brake means carried by the static head comprises a pair of friction plates and the friction brake member attached to the movable head comprises a brake plate operable between said friction plates with movement of said movable head.

8. An unbalance force indicator according to claim 5, wherein said friction brake means comprises a pair of friction plates and said brake member comprises a brake plate operable between said friction plates, said means carried by the static head for adjusting the friction brake means carried by said static head comprising calibrated adjustment means having a control screw provided with a control knob having a calibrated indicating dial.

9. An unbalance force indicator according to claim 5 wherein said friction brake means comprises a pair of friction plates and said brake member comprises a brake plate operable between said friction plates, said means carried by the static head for adjusting the friction brake means carried by said static head comprising calibrated adjustment means having a control screw provided with a control knob having a calibrated indicating dial, and an actuator spring coacting with said control screw to apply more or less pressure to said friction plates.

10. An unbalance force indicator according to claim 5, wherein said friction brake means comprises a pair of friction plates, and said brake member comprises a brake plate operable between said friction plates, said means carried by the static head for adjusting the friction brake means carried by said static head comprising calibrated adjustment means having a control screw provided with a control knob having a calibrated indicating dial, an actuator spring, and a ball interposed between and coacting with said control screw and said actuator spring for applying more or less pressure to said friction plates by movement of said screw.

11. An unbalance force indicator according to claim 5 wherein said friction brake means comprises a pair of friction plates and said brake member comprises a brake plate operable between said friction plates, said means carried by the static head for adjusting the friction brake means carried by said static head comprising calibrated adjustment means having a control screw provided with a control knob having a calibrated indicating dial, and linkage means between said control screw and said friction plates and actuated by movement of said screw for applying more or less pressure to said friction plates.

References Cited in the file of this patent

UNITED STATES PATENTS

| | | |
|---|---|---|
| 2,001,826 | Russell et al. | May 21, 1935 |
| 2,205,510 | Wolfram | June 25, 1940 |
| 2,289,200 | Lundgren | July 7, 1942 |
| 2,420,765 | Annis | May 20, 1947 |
| 2,731,834 | Fehr et al. | Jan. 24, 1956 |